US009819509B2

(12) United States Patent
Nugent et al.

(10) Patent No.: US 9,819,509 B2
(45) Date of Patent: Nov. 14, 2017

(54) SYSTEMS AND METHODS FOR LOCATION-BASED CONTROL OF EQUIPMENT AND FACILITY RESOURCES

(71) Applicant: ARC Informatique, Sèvres (FR)

(72) Inventors: Edward Nugent, Woburn, MA (US);
Pierre de Bailliencourt, Sèvres (FR);
Armin Kaltenbacher, Altdorf (DE);
Anton Mishkinis, Sèvres (FR)

(73) Assignee: ARC Informatique, Sèvres (FR)

( * ) Notice: Subject to any disclaimer, the term of this patent is extended or adjusted under 35 U.S.C. 154(b) by 0 days.

(21) Appl. No.: 15/211,383

(22) Filed: Jul. 15, 2016

(65) Prior Publication Data
US 2017/0019264 A1 Jan. 19, 2017

Related U.S. Application Data

(60) Provisional application No. 62/215,576, filed on Sep. 8, 2015, provisional application No. 62/193,910, filed on Jul. 17, 2015.

(51) Int. Cl.
*H04W 24/00* (2009.01)
*H04L 12/28* (2006.01)
(Continued)

(52) U.S. Cl.
CPC ............ *H04L 12/282* (2013.01); *H04L 67/18* (2013.01); *H04L 67/306* (2013.01); *H04W 4/021* (2013.01);
(Continued)

(58) Field of Classification Search
CPC ..... H04L 12/282; H04L 67/18; H04L 67/306; H04L 29/08; H04L 2012/2841;
(Continued)

(56) References Cited

U.S. PATENT DOCUMENTS 7,752,511 B2 * 7/2010 Fulton ................. G05B 19/058
714/725
7,953,513 B2 * 5/2011 Bhat ....................... B29C 49/78
700/17
(Continued)

FOREIGN PATENT DOCUMENTS

WO    WO 2014070220 A2 *  5/2014   ............ H04W 4/021
WO    WO 2014070221 A1 *  5/2014   ........ H04M 1/72563
(Continued)

*Primary Examiner* — Mahendra Patel
(74) *Attorney, Agent, or Firm* — McCarter & English, LLP; David R. Burns

(57) ABSTRACT

Exemplary embodiments provide for a method, a system, and a computer readable medium for providing automation and control of equipment and facility resources via a mobile device of a user. Location information of a user in or near a facility is detected using a position sensor. The location information is communicated wirelessly from a mobile device of the user to a server. One or more actions are determined as being available to the user based on the location information and user role, where the actions are representative of the actions available in an ICS application. Instructions are communicated to cause the mobile device to display the determined actions in a user interface, enabling the user to receive messages and interact with equipment or facility resources located in proximity of the user by interacting with the one or more actions displayed in the user interface.

32 Claims, 11 Drawing Sheets

(51) Int. Cl.
   *H04W 4/02*      (2009.01)
   *H04L 29/08*     (2006.01)
   *H04W 4/04*      (2009.01)

(52) U.S. Cl.
   CPC ............ *H04W 4/023* (2013.01); *H04W 4/043*
                   (2013.01); *H04L 2012/2841* (2013.01)

(58) Field of Classification Search
   CPC ......... H04L 29/06; H04L 67/12; H04L 12/28;
              H04W 4/023; H04W 4/021; H04W 4/043;
              H04W 4112/28; H04W 4/04; H04W 4/02;
              G06F 15/16; G06F 2217/04; G01R 19/28;
              H04M 1/24; H04M 1/72525; G05B
              2219/23258; G05B 2219/25067; G05B
              19/0426
   USPC .................. 455/456.3; 717/105; 345/630
   See application file for complete search history.

(56) References Cited

U.S. PATENT DOCUMENTS

| | | | | |
|---|---|---|---|---|
| 8,195,844 B2* | 6/2012 | Fulton | ................... | G05B 19/05 710/15 |
| 2004/0034498 A1* | 2/2004 | Shah | .................. | G01R 19/2516 702/127 |
| 2007/0294342 A1* | 12/2007 | Shah | ................... | G06F 9/44505 709/203 |
| 2008/0028338 A1* | 1/2008 | Kodosky | ............ | G05B 19/0426 715/835 |
| 2008/0034121 A1* | 2/2008 | Dove | ....................... | G06F 8/34 709/249 |
| 2008/0066053 A1* | 3/2008 | Ramamoorthy | ... | G05B 19/0426 717/114 |
| 2012/0173981 A1* | 7/2012 | Day | .................... | G06F 3/04817 715/719 |
| 2015/0277702 A1* | 10/2015 | Hardwick | ......... | H04M 1/72563 715/835 |
| 2015/0286348 A1* | 10/2015 | Hardwick | ......... | G06F 17/30991 715/843 |
| 2015/0295776 A1* | 10/2015 | Hardwick | ........... | G06F 3/04817 715/738 |
| 2015/0365794 A1* | 12/2015 | Hardwick | ............. | H04W 4/021 455/457 |

FOREIGN PATENT DOCUMENTS

| | | | | |
|---|---|---|---|---|
| WO | WO 2014070222 A1 * | 5/2014 | ....... | G06F 17/30991 |
| WO | WO 2014070223 A1 * | 5/2014 | ......... | G06F 3/04817 |
| WO | WO 2014070220 A3 * | 9/2014 | ............ | H04W 4/021 |

* cited by examiner

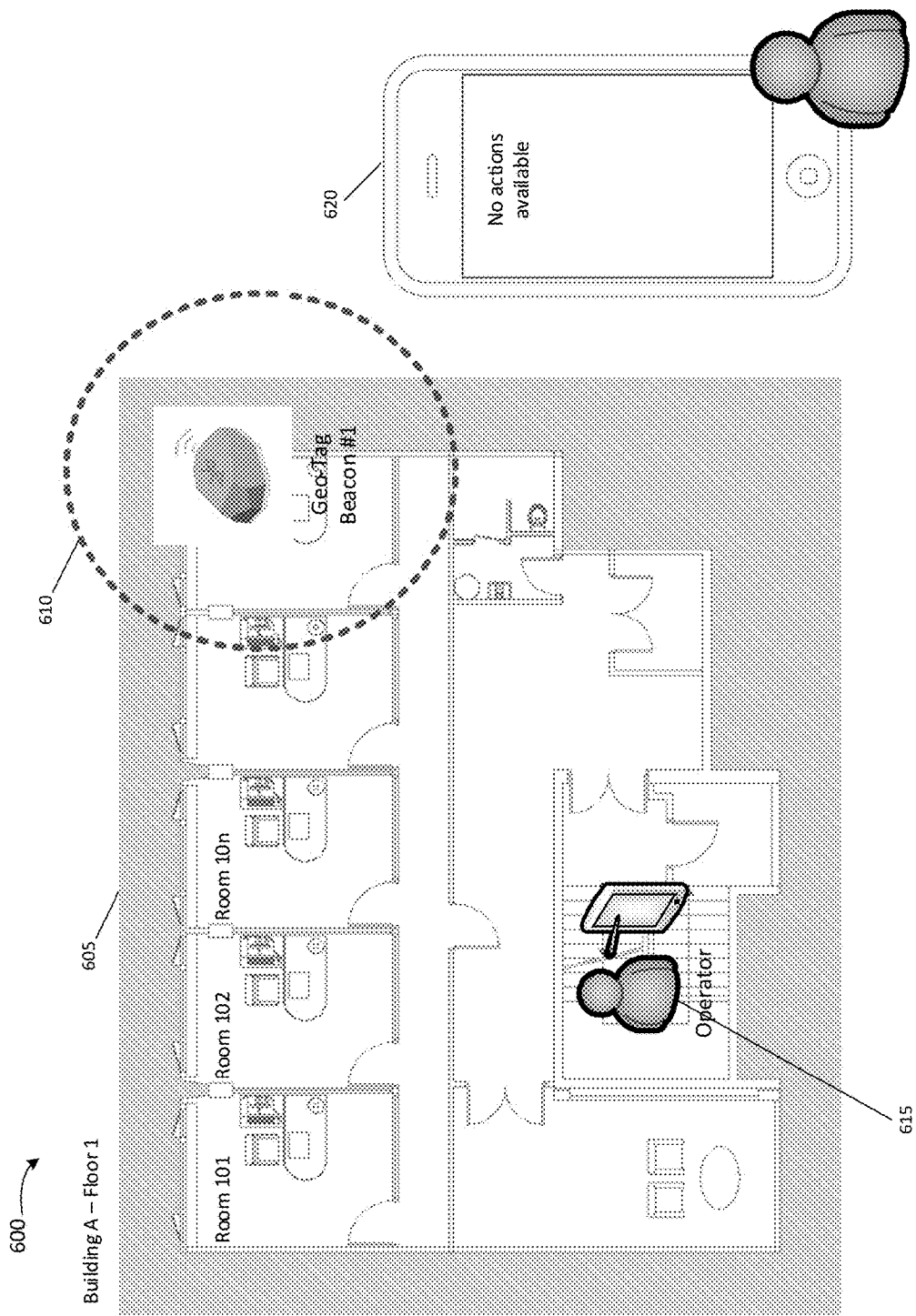

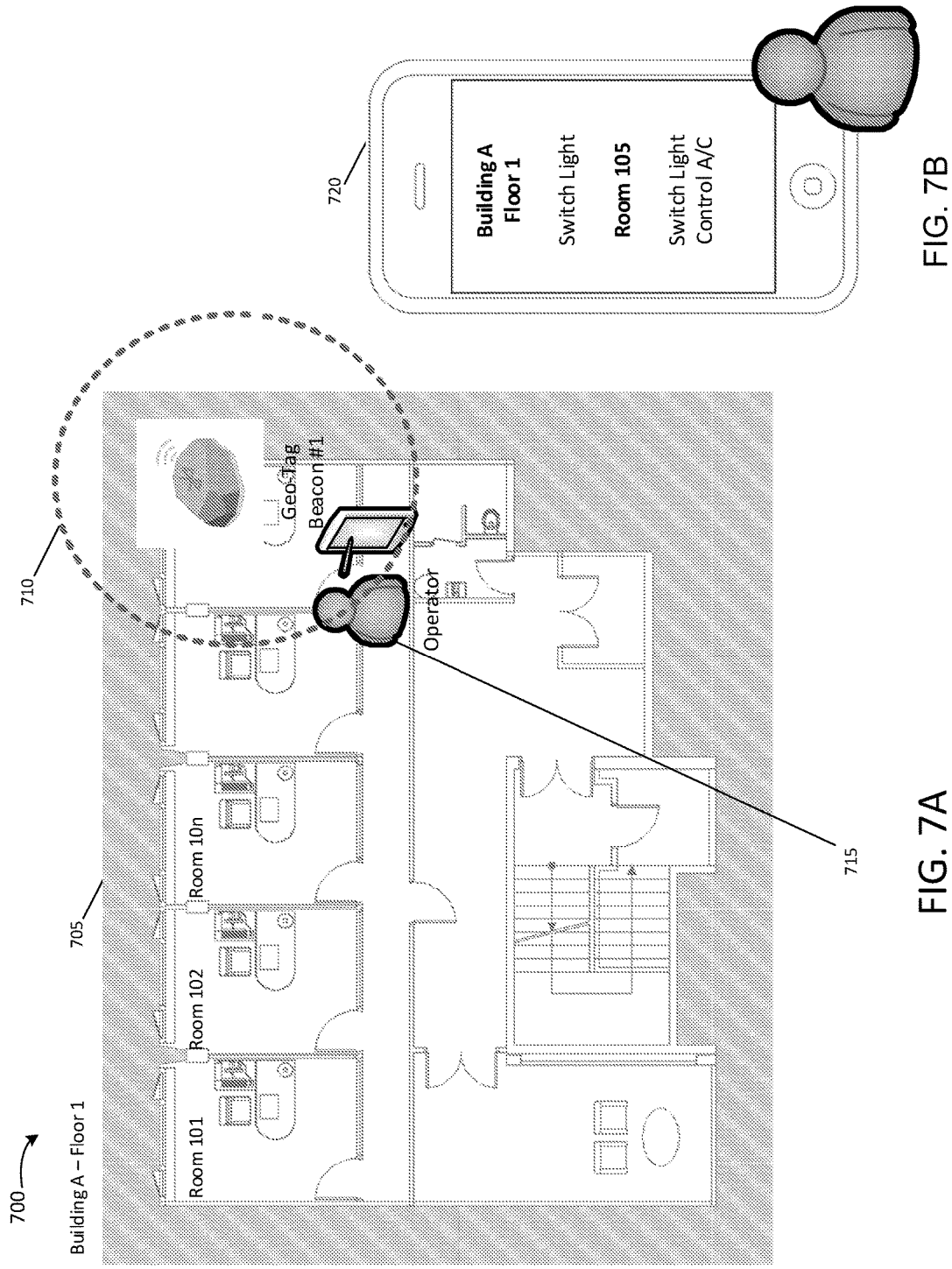

SYSTEMS AND METHODS FOR LOCATION-BASED CONTROL OF EQUIPMENT AND FACILITY RESOURCES

RELATED APPLICATIONS

This application claims the benefit of priority to U.S. Provisional Patent Application No. 62/193,910 filed on Jul. 17, 2015, which is hereby incorporated by reference in its entirety. This application also claims the benefit of priority to U.S. Provisional Patent Application No. 62/215,576 filed on Sep. 8, 2015, which is hereby incorporated by reference in its entirety.

BACKGROUND

Field operators and other mobile users who, while working either indoors or outdoors, rely on an automation-based Industrial Control System (ICS) including Supervisory Control and Data Acquisition (SCADA) system, Building Management System (BMS), Building Automation System (BAS), Human Machine Interface (HMI) or Manufacturing Execution System (MES) to perform their duties, do not have easy access to information based on their location and job responsibilities on mobile devices. Traditional solutions rely on remote desktop services and web browsers to provide a remote view that mimics the host ICS. Using traditional solutions, it can be difficult and time consuming for the user to navigate and filter the remote view of the host system for the desired actions on their mobile devices given the wide set of data, commands, actions and messages available on the host system.

BRIEF DESCRIPTION OF DRAWINGS

Some embodiments are illustrated by way of example in the accompanying drawings and should not be construed to limit the present disclosure:

FIG. 6A is a diagram illustrating a floor layout in a building implementing the location-based automation and control system, according to an example embodiment;

FIG. 6B is a diagram illustrating a screen of a mobile device of a user on the floor depicted in FIG. 6A, according to an example embodiment;

FIG. 7A is a diagram illustrating a floor layout in a building implementing the location-based automation and control system, according to an example embodiment;

FIG. 7B is a diagram illustrating a screen of a mobile device of a user on the floor depicted in FIG. 7A, according to an example embodiment;

DESCRIPTION OF EXEMPLARY EMBODIMENTS

Figure 1:
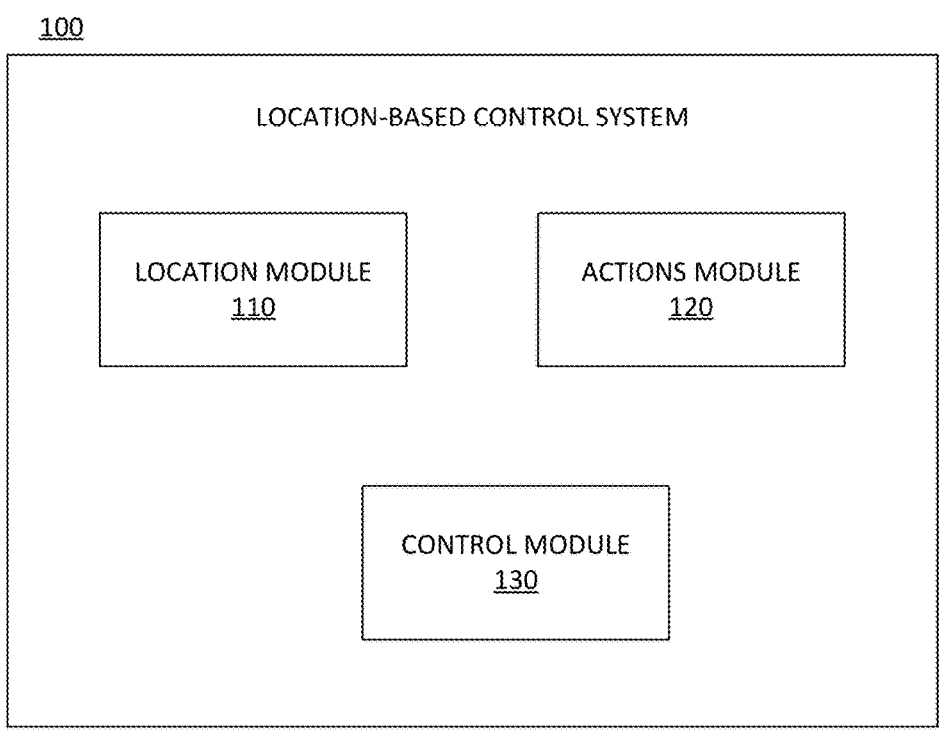
FIG. 1 is a block diagram showing a location-based control and automation system implemented in modules, according to an example embodiment.

Described in detail herein are systems, methods, and computer readable medium for providing control of equipment and building resources via a mobile device of a user based on location. Exemplary embodiments include detecting location information of a user in a building using a location sensor installed in the building, determining one or more actions available to the user based on the location information, where the actions are representative of actions available in a SCADA application, BMS or BAS, and communicating wirelessly to the mobile device instructions to cause the mobile device to display a user interface with the determined actions, where the user interface enables the user to interact with equipment or building resources located in proximity of the user.

An entity or organization may use a computer-implemented automation-based control system to facilitate control of various equipment, machinery, or facility resources. Such control systems may be known in the industry as Industrial Control Systems (ICS). Within this general category such automation-based control systems are also known as supervisory control and data acquisition systems (SCADA), building management systems (BMS), building automation systems (BAS), Human Machine Interface (HMI) or Manufacturing Execution Systems (MES). The ICS operates with coded signals over communication channels to provide remote control of equipment, and to acquire information about the status of an equipment that can be displayed on a user device. The ICS can include a human-machine interface (HMI) to facilitate automated monitoring and control of an equipment via a user interface. The BMS and the BAS are computer-based automation and control systems installed in buildings that aids in controlling and monitoring the building's mechanical and electrical resources, such as, ventilation, lighting, power systems, fire alarm systems, security systems, and the like. The MES are computer-based automation and control systems installed in manufacturing plants that aid in plant equipment and materials management to ensure that products are produced according to plan and providing a manufacturing history and genealogy of the process. The ICS including SCADA, BMS, BAS, HMI and MES may be referred to herein as the host system.

Using traditional solutions, it can be difficult and time consuming for the user to navigate and filter the remote view of the host system for the desired actions on their mobile devices given the smaller screen size available and the wide set of data, commands, actions and messages available on the host system. In addition, it is desirable to utilize emerging channels for delivering data, commands, actions and messages are such as wearable devices and augmented reality displays. The location-based automation and control system significantly improves the efficiency of the user to have an automatic filter that provides relevant information and controls to the user mobile device based on the user's rights and the user's physical location.

Smart device evolution is occurring in an ever more connected world of the Internet of Things (IoT) or, when applied to the industrial automation world, the Industrial Internet of Things (IIoT). Geo-tags, which are an IoT technology for Indoor Positioning Systems (IPS), are a key element of the new mobility architecture for ICS. Geo-tag technologies include Bluetooth Low Energy (BLE) Beacons, Near Field Communication (NFC) and QR-Codes (a barcode format) and other technologies such as WiFi Positioning System (WPS).

These technologies plus Global Position System (GPS) for outdoor positioning are standard on modern mobile devices. Using IPS or GPS, the mobile device is able to know its current location. If an app on the device validates and maintains the user's identity, the device is now able to communicate who the user is and where they are located in real-time. In the distributed environment of many ICS, there are different servers providing information and controls for various zones of control. A zone of control may refer to all the equipment in a physical zone such as a floor in a modern high-rise, or it may refer to an automation system such as elevators or HVAC.

In today's world, a mobile worker is required to know what assets are included in each zone as well as how to connect to the specific server for that zone in order to access relevant information and controls. Given the many different publishers of the server software, it is unlikely that the zone servers have information organized in a consistent way or have a consistent user interface. This greatly complicates the process for a mobile worker to access the information and controls required to perform their role in the use, operation or maintenance of a building or industrial facility.

The location-based automation and control system described herein consists of an application (also referred to as an "app") running on a mobile device, a set of centralized application servers and one or more position sensors or geo-tags for determining indoor location or GPS for determining outdoor location. The location-based automation and control system relies on the existence of standard networks connecting the components of the system. The system modules generate events, which are linked to actions such as sending updated information messages and controls to a mobile worker based on the worker's job function and the equipment in the worker's proximity. The input to the logic module is the workers identity and/or current position/location information. The location-based automation and control system described herein further solves the problem of providing real-time location of mobile workers, which is not easily known by ICS applications. Tracking using access control systems or RFID provides an approximate location, however, the system described here provides indoor tracking of mobile workers using position sensors installed at various parts of the building when indoors or GPS signals when outdoors. The location-based automation and control system is provided in the form of an application and can be installed on existing and commercially-available mobile devices including phones, tablets, wearable devices and augmented reality equipment.

In an embodiment, mobile devices are usually in the possession of mobile workers and are used to inform the host system (SCADA, BMS or BAS) of the device's location, regardless of if the device is indoors or outdoors. This information, along with the workers credentials or user profile, provides the host system with a location and role-based context which is subsequently used as input to filter data, commands and actions that are made available to the mobile worker. These actions include automatically presenting the relevant information and controls to the worker on his mobile device. With continuous evaluation of location sensors, the mobile device automatically maintains information on its current position with the host system. This enables the host system to execute predefined actions and provide the mobile application with information and controls in the context of the worker's current location as they move within a facility, campus or industrial complex.

Figure 9:
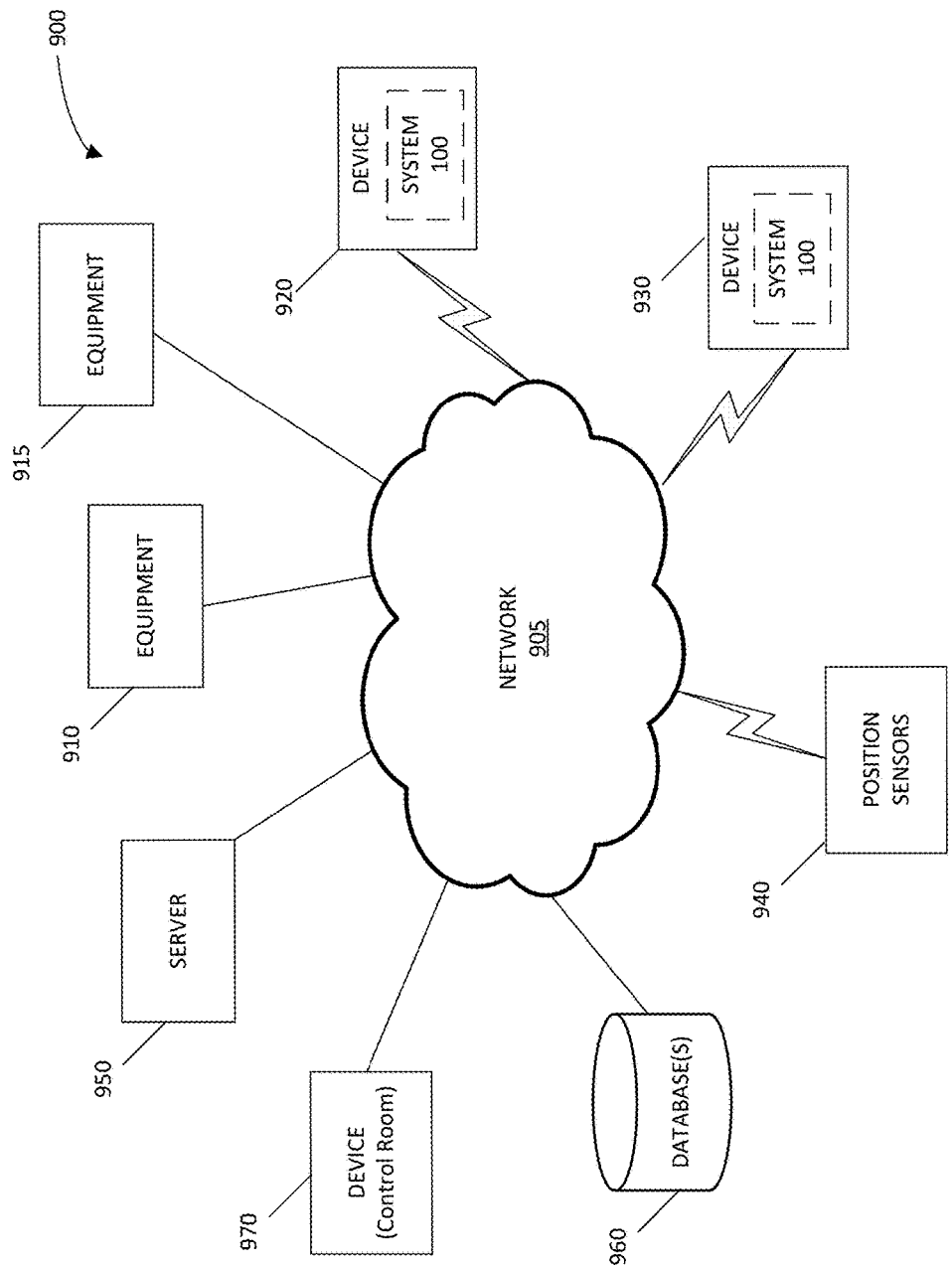
FIG. 9 illustrates a network diagram depicting a system for implementing the location-based automation and control system, according to an example embodiment.

The location-based automation and control system is enabled using GPS or Indoor Positioning System (IPS) geo-tags (for example, position sensors 940 of FIG. 9). Such geo-tags may comprise, but are not limited to, GPS, Bluetooth Low Energy (BLE) beacons, Near Field Communication (NFC) devices, QR codes, barcodes, any other commercially available position sensors, or any combination thereof. The geo-tags may be referred to herein as position sensors, which when associated to a physical point in the facility enable the host (ICS) to determine location. In addition to the specific location, a zone concept is incorporated in the system allowing for actions and information to be distributed based on a hierarchy of rules. The system continuously evaluates signals coming from position sensors to determine, within the context of the job responsibilities of the worker using the mobile device, the proper filtering of the available measures, commands, actions and messages. As a result, the system pushes relevant information and controls to the worker's device automatically and the worker's current physical location is recorded by the host (ICS).

As a result of continuously receiving updated position information from the mobile device, the host system is able to track mobile workers and moving assets. This information enables the host system to maintain awareness of the mobile worker's real-time location. The system records and then recognizes patterns of movement of the worker. The location and the movement of the worker can be visualized on the host system's user interface. In some embodiments, automatic notifications based on a worker's location are transmitted to the worker's mobile device or transmitted to security and emergency personnel.

The system reacts to movement by generating events. The events include the generation and persistence of a movement profile, automated environmental adaptation, appropriate security or safety-related actions, messages or other work processes based on the proximity of qualified worker to the problem areas or areas of interest.

The following description is presented to enable any person skilled in the art to create and use a computer system configuration and related method and article of manufacture to provide control of equipment and facility resources via a mobile device of a user based on the user's location. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In an embodiment, the position sensors are deployed in areas of interest within the building or facility. Additionally, or as an alternative, certain points of interest, such as entry points to zones, gates, windows, rooms, moving assets, etc. are equipped with NFC devices and QR code type position sensors. The system configuration software includes functions for printing unique identifiers to QR codes and for storing unique identifiers to NFC devices. The position sensors are stored in a database and associated with their corresponding locations and zones. Further, the locations and zones are associated with actions, events and messages. This association is done through both the host system as well as from the mobile application for the location-based automation and control system.

FIG. 1 is a block diagram 100 showing a location-based automation and control system in terms of modules according to an example embodiment. The modules may be implemented in devices 920, 930 shown in FIG. 9. The modules may include a location module 110, an actions module 120 and a control module 130. The modules may include various circuits, circuitry and one or more software components, programs, applications, apps or other units of code base or instructions configured to be executed by one or more processors included in devices 920, 930. In other embodiments, one or more of modules 110, 120, 130 may be included in server 950 while other of the modules 110, 120, 130 are provided in the device 920, 930. Although modules 110, 120, and 130 are shown as distinct modules in FIG. 1, it should be understood that modules 110, 120, and 130 may be implemented as fewer or more modules than illustrated. It should be understood that any of modules 110, 120, and 130 may communicate with one or more components included in system 900 (FIG. 9), such as database(s) (e.g., database(s) 960), server (e.g., servers 950), equipment (e.g., equipment 910, 915), position sensors (e.g., position sensors 940), or devices (e.g., devices 920, 930, 970).

The location module 110 may be configured to detect location information of a user. The actions module 120 may be configured to determine one or more actions available to a user based on the user's location. The control module 130 may be configured to enable control of equipment and building resources.

Figure 2:
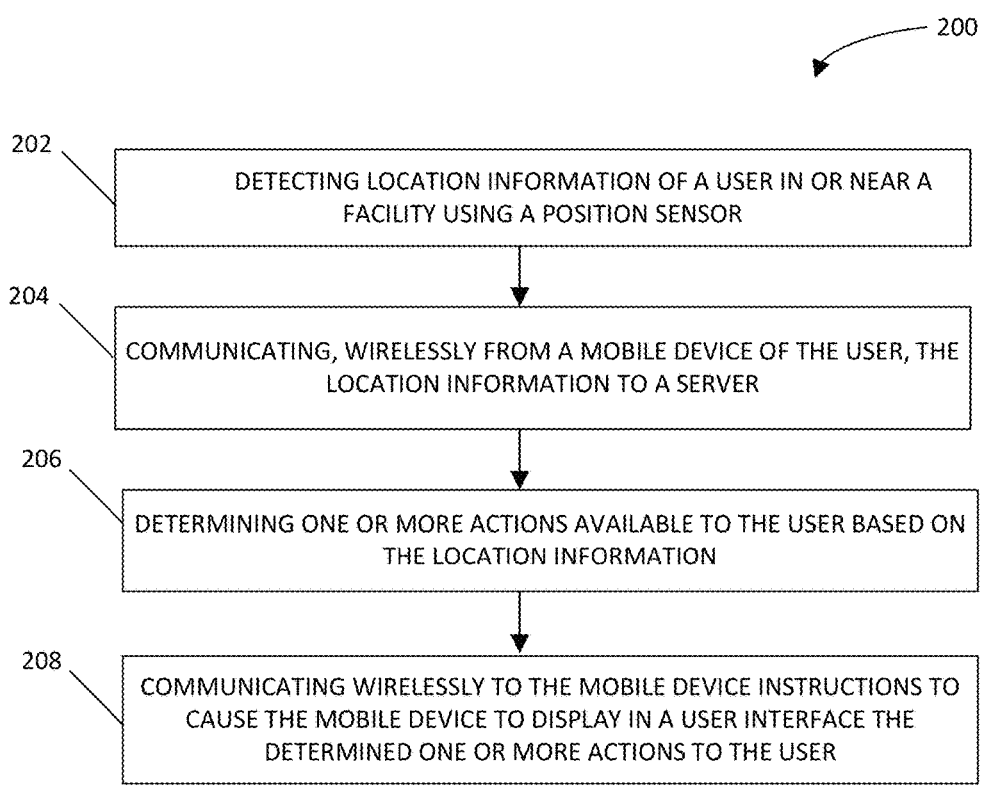
FIG. 2 is a flowchart showing an example method for providing control of equipment and facility resources via a mobile device of a user based on the user's location, according to an example embodiment.

FIG. 2 is a flowchart showing an example method 200 for providing control of equipment and facility resources via a mobile device of a user based on the user's location, according to an example embodiment. The method 200 may be performed using the modules in the location-based automation and control system 100 shown in FIG. 1.

In operation 202, the locations module 110 is configured to detect location information of a user in a building using a position sensor installed in the building or GPS signal from the user's mobile device when outdoors. In an example embodiment, the locations module 110 is configured to continuously scan for a position sensor in proximity of the user. In some embodiments, operation 202 is performed by the mobile device.

In operation 204, the locations module 110 is configured to communicate, wirelessly from a mobile device of the user, the position information to a server. In an example embodiment, the server hosts an ICS. The ICS may be commercially available applications or systems.

In operation 206, the actions module 120 is configured to determine one or more actions available to the user based on the location information. The one or more actions are representative of actions available to a user in an ICS. In another embodiment, the locations module 110 is configured to communicate a user profile to the server, and the actions module 120 is configured to determine the one or more actions based on the user profile. The user profile may include information relating to user identity. The actions module 120 is configured to determine the one or more actions by querying a database to determine the one or more actions available to the user, where the database stores information related to location of the position sensors. The actions module 120 may be further configured to store the location information in a database as associated with the user. In some embodiments, the actions module 120 is configured to generate one or more events based on the location information of the user.

In operation 208, the actions module 120 is configured to communicate wirelessly to the mobile device instructions to cause the mobile device to display in a user interface the determined actions from operation 206 to the user. The user interface enables the user to interact with equipment or building resources located in proximity of the user. The user can do so by interacting with the actions displayed in the user interface. The actions may be displayed as selectable control buttons.

In an example embodiment, the locations module 110 is configured to detect a change in the location information of the user, and the actions module 120 is configured to update the actions displayed on the mobile device based on detecting the change in the location information. In some embodiments, the actions module 110 is configured to determine relevant information based on the user's location, and cause the mobile device to display the relevant information. For example, the relevant information may be related to equipment located near the user.

The relevant actions may be provided in a user interface displayed on the user's mobile device as control buttons. In some embodiments, the control buttons may be clicked, toggled or selected by the user to control equipment or building resources. In other embodiments, the control buttons may be slider control. In other embodiments, the control buttons may be a radio button or a check-box that can be selected by the user. The relevant information may be provided in the user interface displayed on the user's mobile device in form of text, graphs, or any other suitable output form.

In some embodiments, a set of access rights may be associated with the user and the mobile device by the host application. The user profile includes user credentials such as a username and password. The user profile may also include information related to access rights for the user. For example, a user may log in to the application on his mobile device using a username and password, and based on the login information a set of access rights may be associated with the user and the mobile device. In an example embodiment, a user may be associated with a user profile for ease of configuration and maintenance of user rights. A user profile helps in identifying a group of users that have, or need to have, similar user rights.

Figure 3:
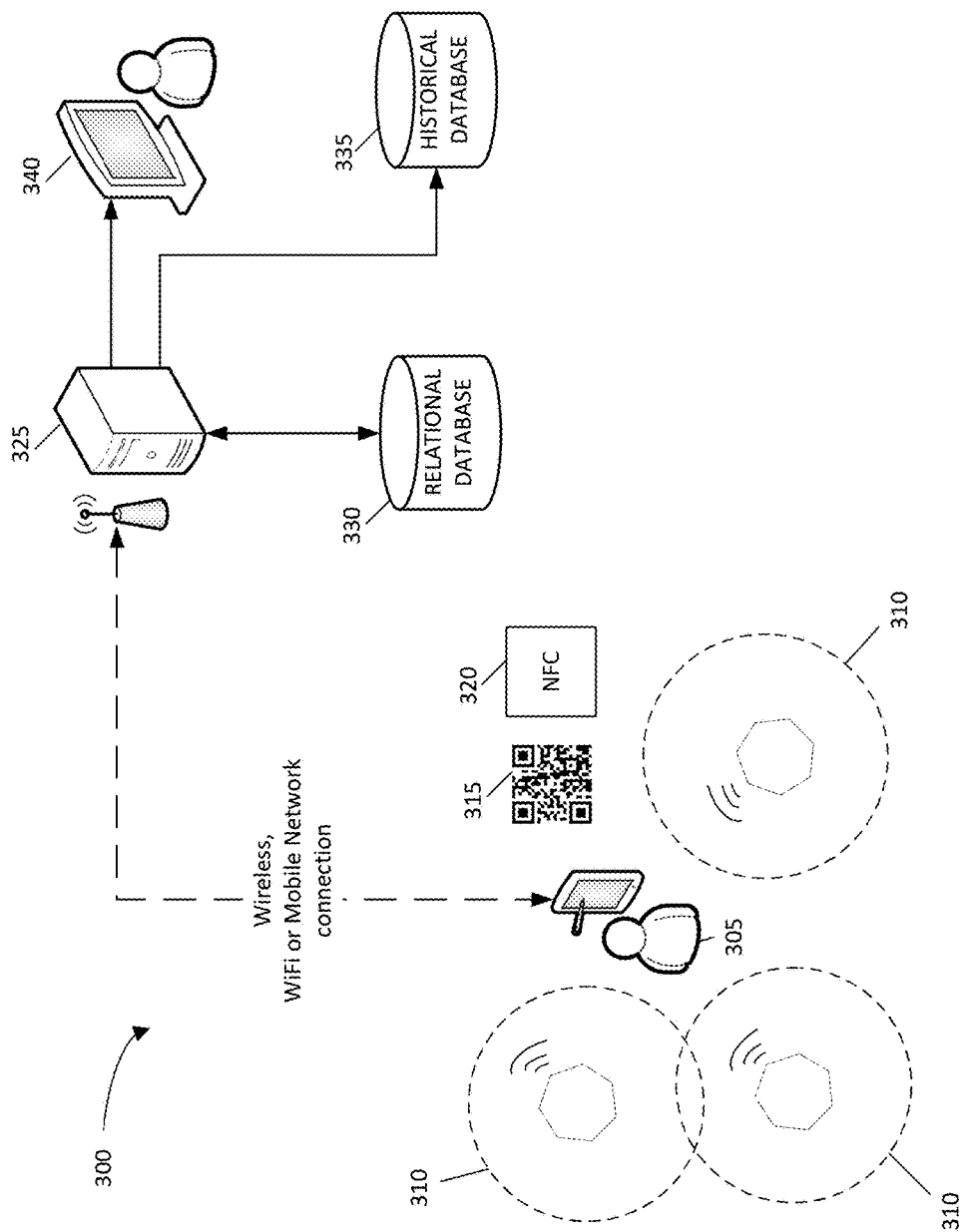
FIG. 3 is a schematic of an example system for providing control of equipment or facility resources to a user via a mobile device, according to an example embodiment.

FIG. 3 is a schematic of an example system 300 for providing control of equipment or building resources to a user via a mobile device, according to an example embodiment. The system 300 includes a mobile device 305, multiple position sensors 310, a Quick Response (QR) code 315, a near field communication (NFC) device 320, a host system 325 (for example, an ICS), a relational database 330, a historical database 335, and a control room device 340.

The mobile device 305 may be used by a user (worker) in a building as part of his job responsibilities to control or monitor equipment or building resources. The location of the user can be detected using various devices in the building. For example, the location sensors 310 may have a predefined area of sensing, and may be registered to identify a user within specific zones or areas in a facility. The position sensors 310 may detect the presence of the mobile device 305. As another example, the user may scan a QR code 315 using their mobile device 305, where the QR code 315 may be located near the user or on an equipment near the user. As another example, the user's location may be detected by a NFC device 320 via the mobile device 305. The position sensors 310, QR code 315 and NFC device 320 are registered in a database as identifying locations, specific zones, areas or equipment.

As discussed, the mobile device 315 includes an application that monitors active position sensors in proximity of the mobile device, and collects passive geo-tag data. A background service included in the application continuously scans the environment for position sensors. The application also includes a user interface that allows the user to scan position sensors such as NFC devices and QR codes. If one or multiple sensors are discovered, the environmental context of the user is sent to the host system. If one or more events are configured for the given context, they are triggered within the host system. If actions are configured for events triggered by the given context, a notification is sent to the mobile device with appropriate information and controls. If one or more messages are associated with the given context they are presented to the user. A message may include text, graphics, or both, and may be displayed on the user's mobile device via a user interface. In some embodiments, the message may be an email message or notification provided on the user's mobile device. The message may provide information to the user related to a context (user's location, user's job responsibilities, user's profile, etc.).

The location information or user profile information of the user/mobile device 305 is transmitted to the host system 325 from the mobile device 305 via a wireless, WiFi, or mobile network connection. The host system 325 may be an ICS configured for the particular facility, and the equipment and resources of the facility. The host system 325 may be implemented in server 950 described in connection with FIG. 9. The host system 325 queries the relational database 330 to determine the information and actions available for the user/mobile device 305 based on the location or user profile information received from the mobile device 305. The host system 325 includes a logic module to process the user's location information and provide the relevant actions and information to the user. The host system also maintains the relational database 330 with actions, locations, and events.

After determining the information and actions available to the user, the host system 325 transmits the data related to the available information and actions to the mobile device 305, so that the user may control and monitor equipment or building resources in his proximity. The mobile device 305 may include an application implementing the location-based automation and control system described herein, where the application generates a user interface displaying information and control buttons based on the available information and available actions determined by the host system 325.

The location information and user profile information is stored or archived in the historical database 335 to maintain a record of the user's movement within the building. The host system 325 also transmits the user's location and user profile information to the control room device 340. The control room device 340 may also display a user interface of the host system 325 to facilitate control and monitoring of any equipment or building resources from the control room.

Figure 4:
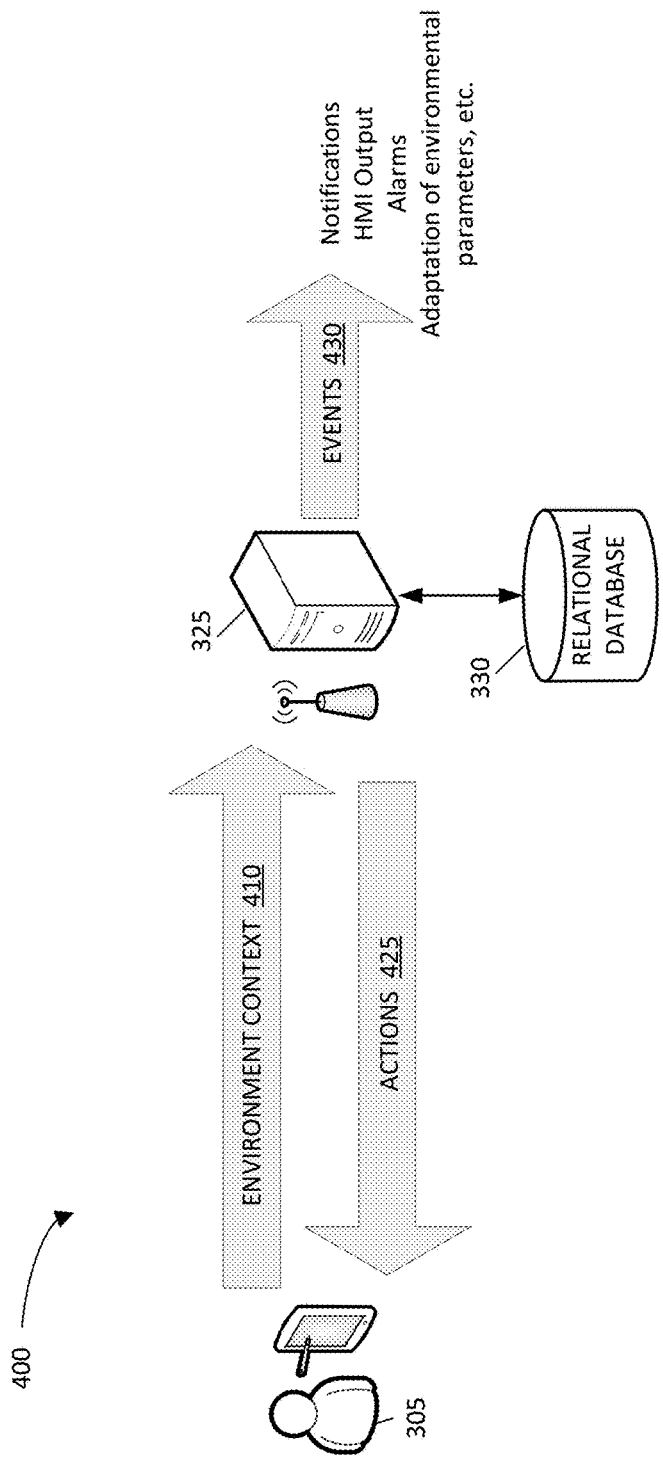
FIG. 4 is a diagram illustrating data flow in a location-based control and automation system, according to an example embodiment.

FIG. 4 is a diagram 400 illustrating data flow in a location-based automation and control system, according to an example embodiment. The system associates actions and events to position sensors, or the location that is indicated by the location sensor, or the zone that is defined by multiple position sensors. These associations are configured using a simple yet flexible expression syntax and vocabulary. It is because of this, that the system offers a high level of scalability. Complexity and effort of commissioning the system are minimized at the same time a high degree of scalability is achieved.

Data is transmitted between the user's mobile device 305 and the host system 325 as described in connection with FIG. 3. The mobile device 305 transmits environment context data 410 to the host system 325. The environment context data 410 may indicate the user's location within a building and a user profile. In some embodiments position sensors may provide images or video such as from augmented reality cameras to determine the environmental context 410. The host system 325 communicates to relational database 330 to determine the information and actions available to the user based on his location and user profile. The host system 325 transmits actions data 425 to the mobile device 305. The actions data 425 may include information and actions available to the user based on his location and user profile. In some embodiments the actions data 425 may be forwarded to augmented reality displays or other equipment. The host system 325 transmits events data 430 to the control room device. The events data 430 may include messages, notifications, user interface output, alarms, control commands for equipment to adjust set points for temperature, security level, and the like.

Figure 5A:
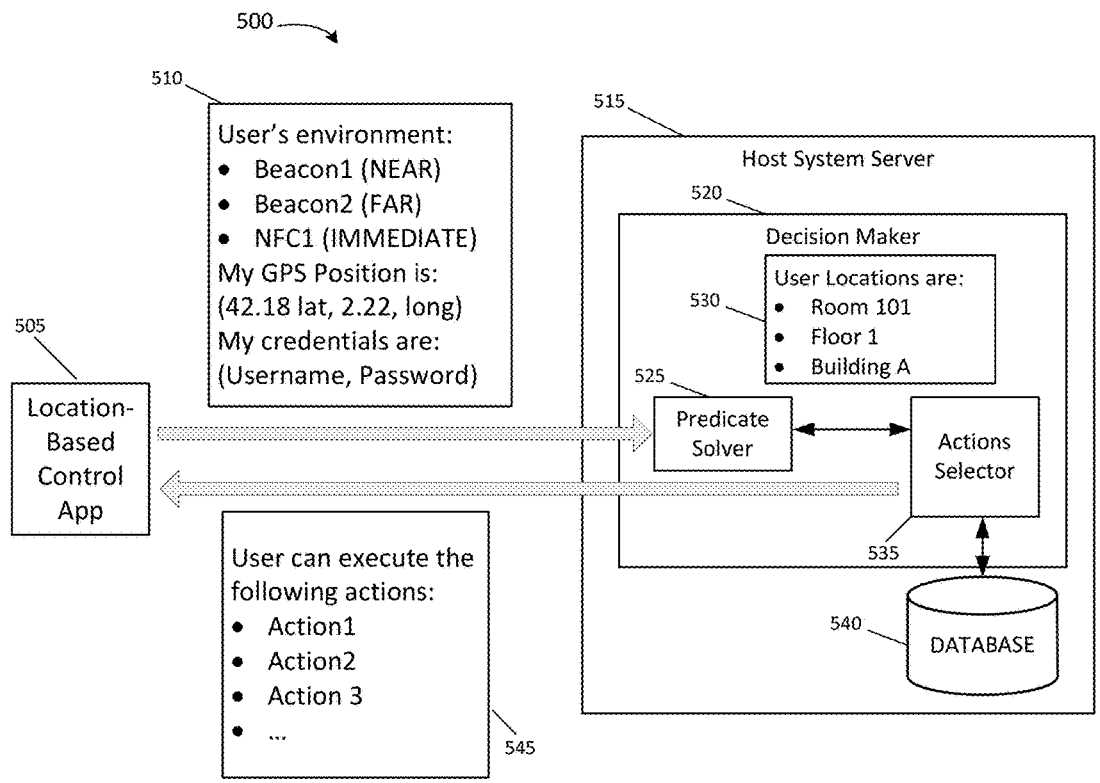
FIG. 5A is a schematic depicting an example system architecture for a location-based automation and control system, according to an example embodiment.
Figure 5B:
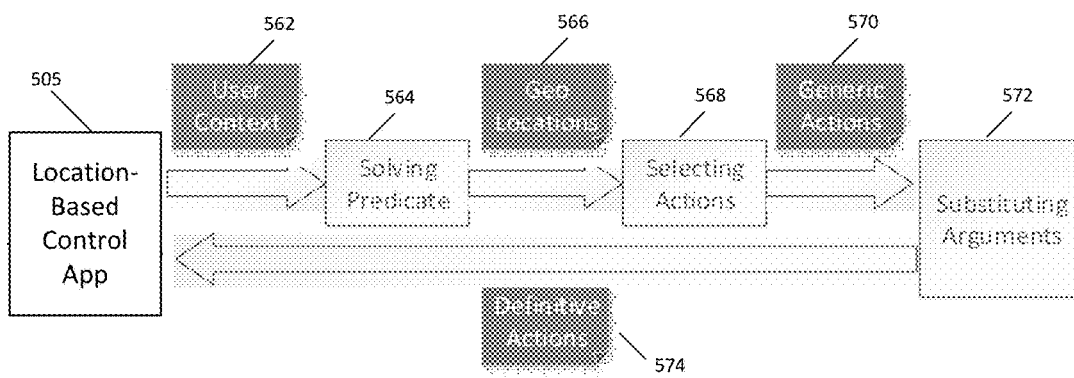
FIG. 5B is a diagram illustrating data flow in the example system architecture of FIG. 5A, according to an example embodiment.

FIG. 5A is a schematic depicting an example system architecture 500 for a location-based automation and control system, according to an example embodiment. FIG. 5B is a diagram illustrating data flow in the example system architecture of FIG. 5A, according to an example embodiment. As described above, functionality of the location-based automation and control system is provided through an application on the mobile device. The application 505 transmits environmental context data 510 to the host system 515. The host system 515 includes a decision maker module 520 having a predicate solver module 525 and action selector 535. The predicate solver module 525 transmits user location data 530 to the action selector 535. The action selector 535 queries database 540 to determine actions available to the user based on his location and identity. The action selector 535 transmits action data 545 to the application 505.

The user's environmental context 510 may include two kinds of data, position data and user data. User data is an access token that allows authentication and authorization and, in general, identification of the user reporting the data. Position data is the data that allows the location of the user. This is enabled by transmitting and evaluating the GPS coordinates given by the mobile device that the location based control app 505 is running on if available (outdoors), and the list of nearby geo-tags 310, 315 and 320. In addition, the position data also contains the distance to present geo-tags of type Beacon 310, so that the exact coordinates of the user is determined or individual tags are removed from the context if their distance to the operator is outside of the meaningful range.

Associating position data with geo-locations 566 is part of the predicate solving 564 shown in FIG. 5B. Geo-locations 566 are hierarchically structured and may contain an arbitrary amount of geo-tags 310, 315, 320 on each level. Geo-locations may also be defined by a geometrical area that is defined by GPS coordinates or any other custom coordinate system. With the given position data, it is consequently possible to associate the present user context 562 with one or multiple geo-locations 564. Generic actions 570 are templates of actions that can be defined to be available to the user within an arbitrary amount of locations. Instead of defining an action for "Control lighting" in every room of a building, a single generic action 570 can be defined for that purpose. The association between a geo-location 566 and a generic action 570 is made by matching criteria. These criteria include matching and filtering on the properties of the location and the action. They are used to generate a query 568 to the relational database 330 which yields a list of generic actions 570. The result of the database query 568 is used to apply substitution on the properties of the yielded generic actions 570 by applying arguments 572 that are obtained by the given geo-location(s) 566. The result of this algorithm is a set of definitive actions 574 that are transmitted back to the location-based control app 505 and exposed to the user.

When an update in the location or environmental context of the mobile device is detected, one or more new actions are made available to the user on his mobile device. Actions may include, but are not limited to: showing list of measurement values including details such as quality of the data; show the trend of one or more values; show logs and historical data; displaying messages associated with the location; initiating one or more commands to the host system; defining or modifying one or more supervisory control set points; showing list of alarms; defining or modifying one or more alarm thresholds; acknowledging or masking an alarm; displaying a symbol that incorporates a visual representation of an asset within the environmental context (the symbol may display the value of measurement or status information which is maintained as a live value or real-time data); loading a recipe; displaying a schedule of events; navigating to a web page or other system resource; and displaying a file. As used herein, alarms may be generated when a particular criterion is met or an event is triggered that requires attention from personnel.

In some cases, an update in the location or environmental context of the mobile device generates new events. In example embodiments, events are executed automatically at the host system. Events may include, but are not limited to: updating and persisting the position of a user; raising an alarm; sending email or SMS; updating of the number of users in a specific area; and adaptation of environmental parameters in a specific area. In some embodiments there may be more than one predicate solver 564, and in an example embodiment the predicate solvers work together exchanging information so that all systems benefit such as sending alarms to safety devices while at the same time notifying the worker of the danger. Adaptation of environmental parameters in a specific area may include such actions as (i) to turning off the light in the office when it is vacant, (ii) adjusting the HVAC settings based on number of people in the room, (iii) adjusting the security level based on the identity of individuals in a zone, or (iv) raising a security alarm if the number of people in a zone exceeds a threshold. Generally, it allows the invention to automatically generate events based on the business-rules based on the position of users.

FIG. 6A is a diagram 600 illustrating a floor layout in a building implementing the location-based automation and control system, according to an example embodiment. FIG. 6B is a diagram illustrating a display screen 620 of a mobile device of a user on the floor depicted in FIG. 6A, according to an example embodiment. As described herein, the location-based automation and control system provides control of equipment and building resources based on a user's location in the building. As in shown in FIG. 6A, the user 615 is located near stairwell on floor 605. A geo-tag beacon 610 is installed on floor 605. The user 615 is not within the geo-tag beacon 610 range for detection, and his present location is not registered for accessing any information or controls for equipment or building resources. Accordingly, as shown on display screen 620 of the mobile device of user 615, there are no actions available to the user via the application's user interface.

FIG. 7A is a diagram 700 illustrating a floor layout in a building implementing the location-based automation and control system, according to an example embodiment. FIG. 7B is a diagram illustrating a display screen 720 of a mobile device of a user on the floor depicted in FIG. 7A, according to an example embodiment. As shown in FIG. 7A, the user 715 is now located within the detection range of the geo-tag beacon 710 (as compared to the use 615 in FIG. 6A). Based on the location information (and in some embodiments the user profile information), the location-based automation and control system provides relevant actions and information to the user 715, as shown on display screen 720 of the mobile device of the user 715. The actions available to the user 715 are determined as described above in connection with FIGS. 1-5. As shown in FIG. 7B, the user 715 has the following actions available to him based on his location in Building A, Floor 1: Switch Light. Based on his proximity to Room 105 in Building A, Floor 1, the user 715 has access to the following actions: Switch light, and Control A/C.

Figure 8:
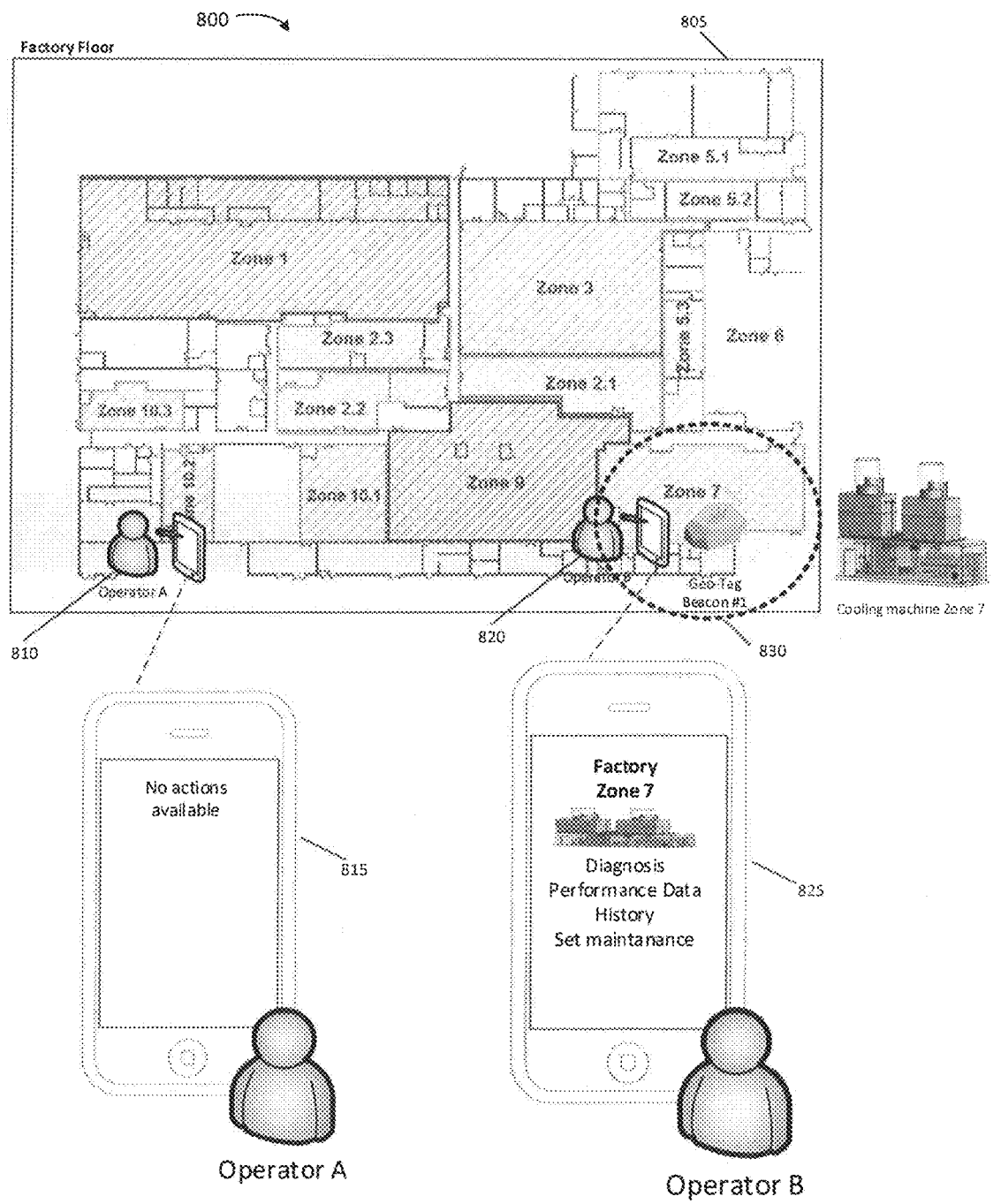
FIG. 8 is a diagram illustrating a floor layout in a building implementing the location-based control and automation system and a screen of mobile devices of two users on the floor, according to an example embodiment.

FIG. 8 is a diagram 800 illustrating a floor layout in a building implementing the location-based automation and control system and a display screen of mobile devices of two users on the floor, according to an example embodiment. As shown in FIG. 8, user 810 and user 820 are at different locations on floor 805. The user 810 is carrying a mobile device whose display screen is illustrated as display screen 815. The user 820 is carrying a mobile device whose display screen is illustrated as display screen 825. The user 810 is not within detection range of a geo-tag beacon, while the user 830 is within detection range of the geo-tag beacon 830. As described herein, the location-based automation and control system determines the information and actions that the user has access based on his location (and in some embodiments based on the user profile). Accordingly, user 810 has access to no actions, as illustrated on display screen 815, while user 820 has access to information and actions relating to equipment located near the geo-tag beacon 830, as illustrated on display screen 825.

In this manner, the systems and methods described herein are for providing control of equipment and building resources via a mobile device of a user based on location. Location information of a user in a building is detected using a position sensor installed in the building. The location information is communicated wirelessly from a mobile device of the user to a server. One or more actions are determined as being available to the user based on the location information, where the actions are representative of the actions available in an ICS application. Instructions are communicated to cause the mobile device to display the determined actions in a user interface, where the user interface enables the user to interact with equipment or building resources located in proximity of the user by interacting with the one or more actions displayed in the user interface. The location-based automation and control system advantageously provides scalability, ease of use, maintainability, and integration with smart devices.

The location-based automation and control system can be used for multiple scenarios. For example, the system can be used in a maintenance setting. A maintenance engineer can monitor an asset (equipment or building resource) that is suspected or known to have malfunctions. The asset can be uniquely identified by a position sensor that is attached to it, or that identifies the location that the asset is located in. In this example, when the mobile device user approaches the asset, the mobile device application may present to the user the following relevant actions: monitoring of real-time data; monitoring of historical data; display of trend-data; access to the user manual of the asset; ability to put the component into maintenance mode; access to the component's alarm list; and acknowledgement of alarms.

As another example, the location-based automation and control system can be used in a diagnostics setting. While roaming one or more facilities, the mobile device user is notified about failure events in their area of responsibility. This area of responsibility is in the context of both the physical area (nearby, zone, full facility, etc.) and the role of the user, which may be configured in the host system.

As a further example, the location-based automation and control system can be used in a commissioning setting. Commissioning equipment for a host system can be a long process. Typically, one worker is at the central host system using a radio to communicate with the mobile worker who can directly verify the status of the equipment. Using the location-based automation and control system described here only one worker is required to commission equipment for the host system. The mobile worker is provided with controls and information for the equipment as he approaches the equipment.

As yet another example, the location-based automation and control system can be used for access control. The system's knowledge of worker's identity and current location enables the construction of an access control system. A staff member or a building visitor requires access to an area. The request is provided to the host system based on worker's proximity to a position sensor previously associated to the access point. Alarms configuration allows alarms to be raised when individual persons are entering or leaving the zone (crossing the virtual fence). The system supports the concept of zone-based user rights. Credentials of a mobile worker are allowed to change depending on the current zone or area as well as the system state or other environmental factors. The system is able to validate the credentials and if appropriate grant access to the worker, modify the workers credentials, thus changing the information and controls provided on the mobile device, and, for a building management system, issue a security or safety warning notification and at the same time invoke actions to apply interlock measures.

As another example, the location-based automation and control system can be used in a safety setting. The system provides a platform for creating a component of a life safety system. Location information is evaluated and actions created to notify mobile workers of an emergency and distribute tailored information providing the best evacuation route according to the workers current location. The host system is able to monitor for any workers left on the scene or alert workers moving in the wrong direction.

As another example, the location-based automation and control system can be used to track workers' location. By monitoring the location of the worker, traffic analysis can be visualized in real-time displayed on 2D or 3D maps. The actions of the system as a result of tracking workers position may raise a security alarm; adjust local environmental controls such as temperature, humidity, ventilation, or A/C, or provide energy balancing based on evaluation of aggregate load.

In another example, the location-based automation and control system can be used for tracking assets such as building equipment. Position sensors associated with assets are registered as part of the location-based automation and control system. The relationship with the position of the asset position sensor compared to other position sensors associated with fixed areas and zones makes it possible for the system to track moving assets, even inside a building or a facility. As in previously described examples, the host system may react to the repositioning of a moving asset automatically through alarming, visualization or recording information.

In another example, the simultaneous presence of two work teams in the same area may cause interference with each other. The interference may disrupt work processes or have a negative impact on the safety of the workers. The location-based automation and control system helps workers who don't know the site to avoid interference by alerting them of the situation and allowing the teams to communicate with each other to resolve the interference with alternate work processes.

The various use examples are possible because the system creates a link between traditional host systems (ICS) and IPS technology to provide proximity-based services to a mobile device user. Existing IPS applications using indoor positioning, indoor navigation and micro-geolocation products are focused on marketing, retail data and public relationship applications. The limited number of IPS applications available for industrial automation (i.e. ICS) do not provide automated dynamic controls and environmentally contextual content to the mobile worker.

The system described here is advantageous over existing technology in that it facilitates the commissioning of an indoor positioning system by taking advantage of generic methods. The system also employs an innovative use of geo-fencing to an indoor-context. The system also explicitly takes advantage of the different characteristics of position sensors in heterogeneous setups. Bluetooth LE Beacons require no proactive action by the mobile device user. NFC devices and QR codes require user interaction and are used for asset identifiers in all basic use cases. When the two varying approaches above are combined additional benefit is generated in that NFC devices and QR codes may be used as validators, for integrity/plausibility checking and as identifiers for tracking moving assets, while Bluetooth LE Beacons can be given to mobile workers as automated worker credentials when carried for the purpose of authorization tags.

The system further incorporates other functional points that do not exist in traditional solutions. The use of a mobile beacon as an identification validator is innovative, and the system further includes an approach to diagnose missing, removed, malfunctioning or powerless position sensors using heuristic methods. Additionally, the system also offers the capability for hands-free operation including the use of wearable mobile devices and augmented reality equipment.

FIG. 9 illustrates a network diagram depicting a system 900 for implementing the location-based automation and control system, according to an example embodiment. The system 900 can include a network 905, multiple pieces of equipment, for example, equipment 910, equipment 915, multiple devices, for example, device 920, device 930, device 970, position sensors 940, server 950, a database(s) 960. Each of the equipment 910, 915, devices 920, 930, 970, position sensors 940, server 950, and database(s) 960 is in communication with the network 905.

In an example embodiment, one or more portions of network 905 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks. In such an embodiment, the communication may be secured by TLS encryption or similar security.

Equipment 910, 915 may also include building resources. Equipment 910, 915 may comprise, but is not limited to, heating, ventilation and air-conditioning systems, electrical systems, plumbing systems, window blinds control systems, lighting systems, elevators and escalators, fire detection and alarm systems, access control systems, security control systems, public address (PA) systems, and the like.

In some embodiments, devices 920, 930 may comprise, but are not limited to, cellular or mobile phones, smartphones, tablets, ultra-books, netbooks, laptops, hand-held devices, wireless devices, portable devices, wearable computers, smart-watches, smart-vision systems, portable digital assistants (PDAs), multi-processor systems, microprocessor-based or programmable consumer electronics, mini-computers, and the like. Devices 920, 930 are used by users in the field or building to control or monitor equipment or building resources based on the user's location or proximity to the equipment and the building resources.

In some embodiments, device 970 may comprise, but is not limited to, work stations, personal computers (PCs), general purpose computers, Internet appliances, hand-held devices, wireless devices, portable devices, wearable computers, cellular or mobile phones, portable digital assistants (PDAs), smartphones, tablets, ultra-books, netbooks, laptops, desktops, multi-processor systems, microprocessor-based or programmable consumer electronics, game consoles, set-top boxes, network PCs, mini-computers, augmented reality headsets, and the like. Device 970 may be located in a control room in a facility or may be located remotely, for example as a Cloud Service, and may provide access to the ICS application.

The devices 920, 930, 970 can include one or more components described in connection with FIG. 10. Each of devices 920, 930, 970 may connect to network 905 via a wired or wireless connection. Each of devices 920, 930 may include one or more applications such as, but not limited to, a web browser application, a GPS application, a network connectivity application, a location-based automation and control application (based on the location-based automation and control system described here), and the like. Device 970 may include one or more applications such as, but not limited to, a web browser, a SCADA system, a BMS application, a BAS application, and the like. In some embodiments, device 970 does not include a location-based automation and control application (based on the location-based automation and control system described here).

In an example embodiment, the devices 920, 930 may perform all the functionalities described herein. In other embodiments, the location-based automation and control system may be included on the device 920, 930, and the server 950 performs the functionalities described herein. In yet another embodiment, the device 920, 930 may perform some of the functionalities, and server 950 performs the other functionalities described herein.

Each of the database(s) 960, and server 950 is connected to the network 905 via a wired connection. Alternatively, one or more of the database(s) 960, and server 950 may be connected to the network 905 via a wireless connection. Although not shown, server 950 can be (directly) connected to the database(s) 960. Server 950 includes one or more computers or processors configured to communicate with devices 920, 930, 970 via network 905. Server 950 hosts one or more applications or websites accessed by devices 920, 930, 970 and/or facilitates access to the content of database(s) 960. Database(s) 960 includes one or more storage devices for storing data and/or instructions (or code) for use by server 950, and/or devices 920, 930, 970. Database(s) 960, and/or server 950, may be located at one or more geographically distributed locations from each other or from devices 920, 930, 970. Alternatively, database(s) 960 may be included within server 950. Server 950 may host one or more components of a ICS, where this system, as described above, facilitates control of various equipment and facility resources.

Figure 10:
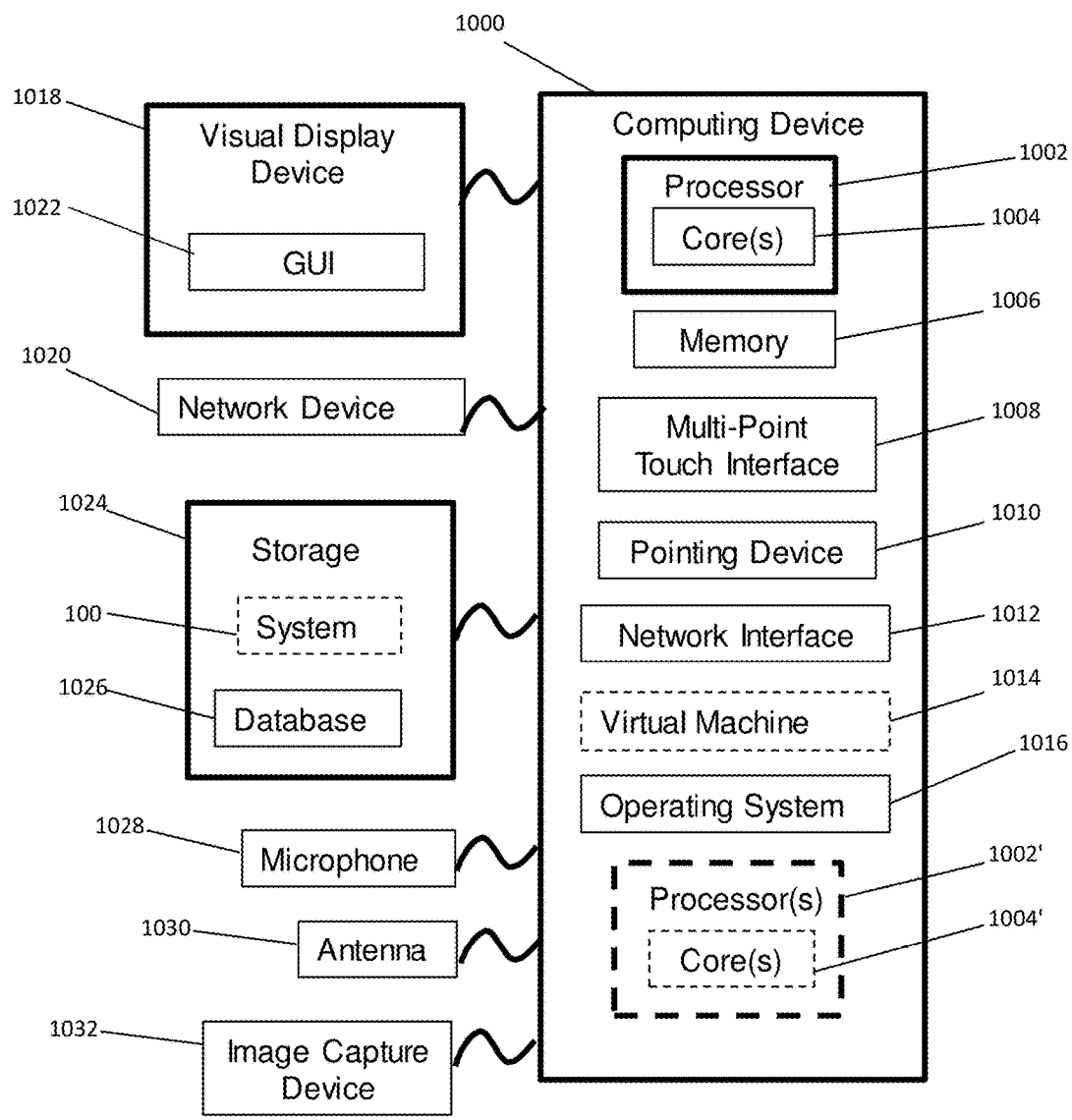
FIG. 10 is a block diagram of an exemplary computing device that may be used to implement exemplary embodiments of the location-based automation and control system described herein.

FIG. 10 is a block diagram of an exemplary computing device 1000 that may be used to implement exemplary embodiments of the location-based automation and control system 100 described herein. The computing device 1000 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 1006 included in the computing device 1000 may store computer-readable and computer-executable instructions or software for implementing exemplary embodiments of the location-based automation and control system 100. The computing device 1000 also includes configurable and/or programmable processor 1002 and associated core 1004, and optionally, one or more additional configurable and/or programmable processor(s) 1002' and associated core(s) 1004' (for example, in the case of computer systems having multiple processors/cores), for executing computer-readable and computer-executable instructions or software stored in the memory 1006 and other programs for controlling system hardware. Processor 1002 and processor(s) 1002' may each be a single core processor or multiple core (1004 and 1004') processor.

Virtualization may be employed in the computing device 1000 so that infrastructure and resources in the computing device may be shared dynamically. A virtual machine 1014 may be provided to handle a process running on multiple processors so that the process appears to be using only one computing resource rather than multiple computing resources. Multiple virtual machines may also be used with one processor.

Memory 1006 may include a computer system memory or random access memory, such as DRAM, SRAM, EDO RAM, and the like. Memory 1006 may include other types of memory as well, or combinations thereof.

A user may interact with the computing device 1000 through a visual display device 1018, such as a computer monitor, which may display one or more graphical user interfaces 1022 that may be provided in accordance with exemplary embodiments. The computing device 1000 may include other I/O devices for receiving input from a user, for example, a keyboard or any suitable multi-point touch interface 1008, a pointing device 1010 (e.g., a mouse), a microphone 1028, and/or an image capturing device 1032 (e.g., a camera or scanner). The multi-point touch interface 1008 (e.g., keyboard, pin pad, scanner, touch-screen, etc.) and the pointing device 1010 (e.g., mouse, stylus pen, etc.) may be coupled to the visual display device 1018. The computing device 1000 may include other suitable conventional I/O peripherals.

The computing device 1000 may also include one or more storage devices 1024, such as a hard-drive, CD-ROM, or other computer readable media, for storing data and computer-readable instructions and/or software that implement exemplary embodiments of the location-based automation and control system 100 described herein. Exemplary storage device 1024 may also store one or more databases for storing any suitable information required to implement exemplary embodiments. For example, exemplary storage device 1024 can store one or more databases 1026 for storing information, such location information of location sensors, user profiles, user access rights, user credentials, one or more actions available to the user, and/or any other information to be used by embodiments of the system 100. The databases may be updated manually or automatically at any suitable time to add, delete, and/or update one or more items in the databases.

The computing device 1000 can include a network interface 1012 configured to interface via one or more network devices 1020 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing device 1000 can include one or more antennas 1030 to facilitate wireless communication (e.g., via the network interface) between the computing device 1000 and a network. The network interface 1012 may include a built-in network adapter, network interface card, PCMCIA network card, card bus network adapter, wireless network adapter, USB network adapter, modem or any other device suitable for interfacing the computing device 1000 to any type of network capable of communication and performing the operations described herein. Moreover, the computing device 1000 may be any computer system, such as a workstation, desktop computer, server, laptop, handheld computer, tablet computer (e.g., the iPad™ tablet computer), mobile computing or communication device (e.g., the iPhone™ communication device), point-of sale terminal, internal corporate devices, or other form of computing or telecommunications device that is capable of communication and that has sufficient processor power and memory capacity to perform the operations described herein.

The computing device 1000 may run any operating system 1016, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 1016 may be run in native mode or emulated mode. In an exemplary embodiment, the operating system 1016 may be run on one or more cloud machine instances.

Figure 11:
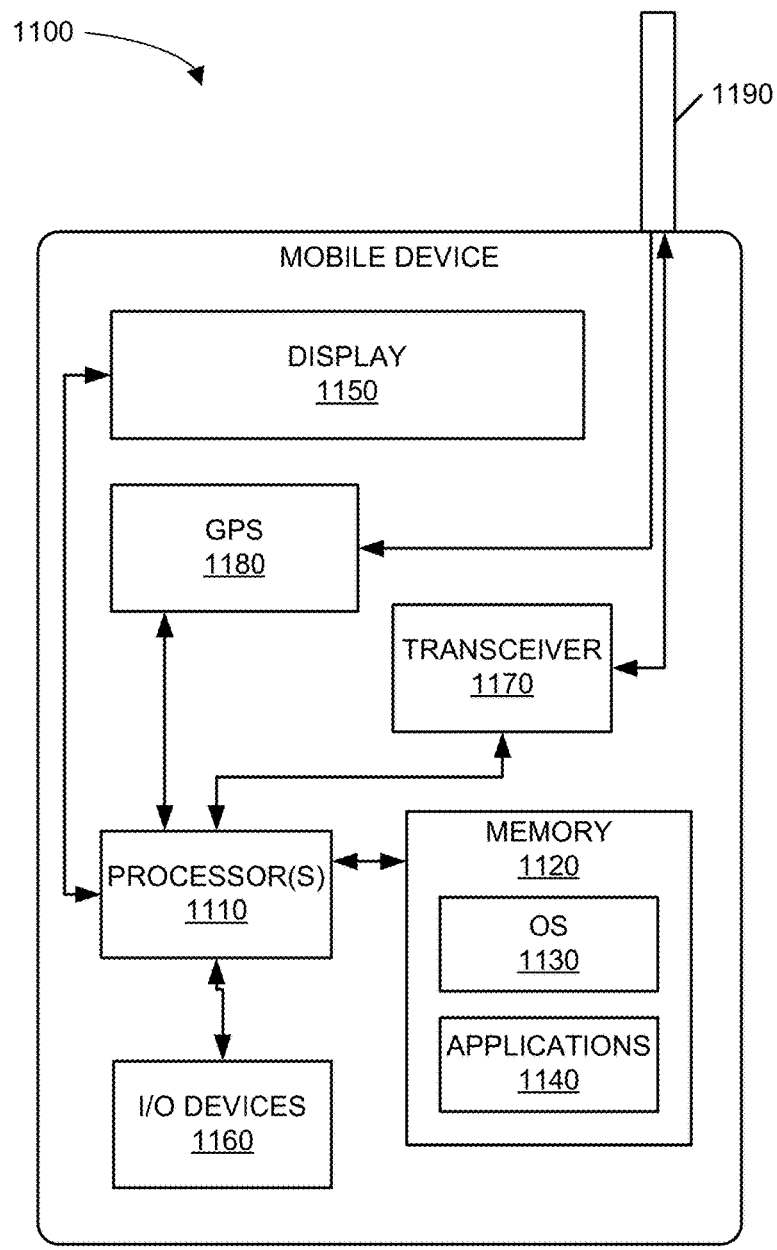
FIG. 11 is a block diagram of an exemplary mobile device that may be used to implement exemplary embodiments of the location-based automation and control system described herein.

FIG. 11 is a block diagram of an exemplary mobile device 1100 that may be used to implement exemplary embodiments of the location-based automation and control system described herein. The mobile device 1100 may include a processor(s) 1110. The processor(s) 1100 may be any of a variety of different types of commercially available processors suitable for mobile devices (for example, NVIDIA System on a Chip (SoC) multicore processors along with graphics processing units (GPU) devices, such as the Tegra K-1, XScale architecture microprocessors, Intel® Core™ processors, Intel® Atom™ processors, Intel® Celeron® processors, Intel® Pentium® processors, Qualcomm® Snapdragon processors, ARM® architecture processors, Microprocessor without Interlocked Pipeline Stages (MIPS) architecture processors, Apple® A series System-on-chip (SoCs) processors, or another type of processor). A memory 1120, such as a Random Access Memory (RAM), a Flash memory, or other type of memory, is accessible to the processor(s) 1110. The memory 1120 may be adapted to store an operating system (OS) 1130, as well as application programs 1140, such as one or more components of the location-based automation and control system described herein, a web browser application, and other applications. The processor(s) 1110 may be coupled, either directly or via appropriate intermediary hardware, to a display 1150 and to one or more input/output (I/O) devices 1160, such as a keypad, a touch panel sensor, a microphone, a speaker, and the like. The processor(s) 1110 may also be coupled to a transceiver 1170 that interfaces with an antenna 1190. The transceiver 1170 may be configured to transmit and receive cellular network signals, wireless data signals, or other types of signals via the antenna 1190, depending on the nature of the mobile device 1100. In this manner, the connection with the communication network 1005 may be established. Further, the mobile device 1100 may also include a GPS 1180 that may also make use of the antenna 1190 to receive and transmit GPS signals. The GPS 1180 may be used to determine location information of a user when he or she is outdoors.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A method for providing control of equipment and facility resources via a mobile device of a user based on location, the method comprising:
    detecting location information of a user in or near a facility using a position sensor;
    communicating, wirelessly from a mobile device of the user, the location information to a server;
    determining one or more actions available to the user based on the location information and a user profile, the actions representative of actions available in an Industrial Control System (ICS) application the determining including querying a database to determine the one or more actions available to the user, the database storing information related to location of the position sensor;
    communicating wirelessly to the mobile device instructions to cause the mobile device to display in a user interface the determined one or more actions to the user, the user interface enabling the user to receive messages and interact with equipment or facility resources located in proximity of the user by interacting with the one or more actions displayed in the user interface;
    scanning continuously for the position sensor in proximity of the user;
        detecting a change in the location information of the user; and
    updating the one or more actions displayed on the mobile device based on detecting the change in the location information.

2. The method of claim 1, wherein the location information is detected using the position sensor installed in the facility when the user is indoors.

3. The method of claim 1, wherein the location information is detected using a GPS signal from the mobile device when the user is outdoors.

4. The method of claim 1, further comprising:
    communicating, wirelessly from the mobile device of the user, the user profile to the server.

5. The method of claim 1, wherein the user profile includes user identity verified by credentials.

6. The method of claim 1, wherein the server hosts the ICS application to control equipment and facility resources.

7. The method of claim 6, wherein the ICS application is a commercially available application.

8. The method of claim 1, further comprising:
    storing the location information as associated with the user in a database.

9. The method of claim 1, further comprising:
    generating one or more events based on the location information of the user.

10. A system for providing control of equipment and facility resources via a mobile device of a user based on location, the system comprising:
    a server;
    a mobile device in wireless communication with the server,
    wherein the mobile device is configured to detect location information of a user in or near a facility using a position sensor, and communicate the location information to the server;
    wherein the server is configured to:
    determine one or more messages or actions available to the user based on the location information and a user profile, the actions representative of actions available in an Industrial Control System (ICS) application, the determining including querying a database to determine the one or more actions available to the user, the database storing information related to location of the position sensor, and
    communicate wirelessly to the mobile device instructions to cause the mobile device to display in a user interface the determined one or more actions to the user, the user interface enabling the user to receive messages and to interact with equipment or facility resources located in proximity of the user by interacting with the one or more actions displayed in the user interface;
        wherein the mobile device is further configured to scan continuously for the position sensor in proximity of the user, and detect a change in the location information of the user; and
    wherein the server is further configured to cause the mobile device to update the one or more actions displayed on the mobile device based on the mobile device detecting the change in the location information.

11. The system of claim 10, wherein the location information is detected using the position sensor installed in the facility when the user is indoors.

12. The system of claim 10, wherein the location information is detected using a GPS signal from the mobile device when the user is outdoors.

13. The system of claim 10, wherein the mobile device is configured to communicate the user profile to the server.

14. A non-transitory computer readable medium storing instructions executable by a processing device, the instructions implementing a method for providing control of equipment and facility resources via a mobile device of a user based on location, the method comprising:
    detecting location information of a user in or near a facility using a position sensor;
    communicating, wirelessly from a mobile device of the user, the location information to a server;
    determining one or more actions available to the user based on the location information and a user profile, the actions representative of actions available in an Industrial Control System (ICS) application, the determining including querying a database to determine the one or more actions available to the user, the database storing information related to location of the position sensor;
    communicating wirelessly to the mobile device instructions to cause the mobile device to display in a user interface the determined one or more actions to the user, the user interface enabling the user to receive messages and interact with equipment or facility resources located in proximity of the user by interacting with the one or more actions displayed in the user interface;
    scanning continuously for the position sensor in proximity of the user;
        detecting a change in the location information of the user; and
    updating the one or more actions displayed on the mobile device based on detecting the change in the location information.

15. The method of claim 1, wherein the one or more actions includes at least one of control of equipment or facility resources, maintenance of equipment or facility resources, or diagnostics of equipment or facility resources.

16. The method of claim 6, wherein the ICS application is one of a supervisory control and data acquisition system application, building management system application, building automation system application, human machine interface application, or a manufacturing execution system application.

17. The system of claim 10, wherein the user profile includes user identity verified by credentials.

18. The system of claim 10, wherein the server is configured to store the location information as associated with the user in a database.

19. The system of claim 10, wherein the server is configured to generate one or more events based on the location information of the user.

20. The system of claim 10, wherein the one or more actions includes at least one of control of equipment or facility resources, maintenance of equipment or facility resources, or diagnostics of equipment or facility resources.

21. The system of claim 10, wherein the server hosts the ICS application to control equipment and facility resources.

22. The system of claim 21, wherein the ICS application is one of a supervisory control and data acquisition system application, building management system application, building automation system application, human machine interface application, or a manufacturing execution system application.

23. The system of claim 21, wherein the ICS application is a commercially available application.

24. The non-transitory computer readable medium of claim 14, wherein the location information is detected using the position sensor installed in the facility when the user is indoors.

25. The non-transitory computer readable medium of claim 14, wherein the location information is detected using a GPS signal from the mobile device when the user is outdoors.

26. The non-transitory computer readable medium of claim 14, wherein the method further comprises communicating, wirelessly from the mobile device of the user, the user profile to the server.

27. The non-transitory computer readable medium of claim 14, wherein the user profile includes user identity verified by credentials.

28. The non-transitory computer readable medium of claim 14, wherein the method further comprises storing the location information as associated with the user in a database.

29. The non-transitory computer readable medium of claim 14, wherein the method further comprises generating one or more events based on the location information of the user.

30. The non-transitory computer readable medium of claim 14, wherein the one or more actions includes at least one of control of equipment or facility resources, maintenance of equipment or facility resources, or diagnostics of equipment or facility resources.

31. The non-transitory computer readable medium of claim 14, wherein the server hosts the ICS application to control equipment and facility resources.

32. The non-transitory computer readable medium of claim 31, wherein the ICS application is a commercially available application.

* * * * *